(12) United States Patent
Kellenberger et al.

(10) Patent No.: US 6,309,136 B1
(45) Date of Patent: Oct. 30, 2001

(54) DEVICE FOR LOCKING A MECHANICAL MEMBER ONTO A SHAFT

(75) Inventors: Peter Kellenberger, Thalwil (CH); Riccardo Scaglia, Milan (IT)

(73) Assignee: Sit S.P.A., Milan (IT)

( * ) Notice: Subject to any disclaimer, the term of this patent is extended or adjusted under 35 U.S.C. 154(b) by 0 days.

(21) Appl. No.: 09/367,980

(22) PCT Filed: Apr. 9, 1998

(86) PCT No.: PCT/EP98/02064

§ 371 Date: Aug. 23, 1999

§ 102(e) Date: Aug. 23, 1999

(87) PCT Pub. No.: WO98/46897

PCT Pub. Date: Oct. 22, 1998

(30) Foreign Application Priority Data

Apr. 14, 1997 (CH) ........................................................ 864/97

(51) Int. Cl.[7] ........................................................ F16D 1/06
(52) U.S. Cl. ........................................ 403/374.3; 403/335
(58) Field of Search ................................... 403/335, 336, 403/337, 338, 367, 368, 370, 373, 374.1, 374.3

(56) References Cited

U.S. PATENT DOCUMENTS 4,268,185 * 5/1981 Mullenberg .......................... 43/370 X
4,557,621 * 12/1985 Mullenberg ....................... 403/370 X
5,639,176 * 6/1997 Mullenberg ....................... 403/368 X

FOREIGN PATENT DOCUMENTS 7302286   7/1974  (DE) .
9527144  10/1995  (EP) .

OTHER PUBLICATIONS

*Patent Abstracts of Japan*, vol. 013, No. 415, (M–870), Sep. 13, 1989 & JP 01 153820 A (Masanori Mochizuki Jun. 16, 1989.

Patent Abstracts of Japan, vol. 013, No. 170 (M–817), Apr. 21, 1989 & JP 01 00330 A (Tsubakimoto Chain Co.) Jan. 9, 1989.

* cited by examiner

*Primary Examiner*—Lynne H. Browne
*Assistant Examiner*—John R. Cottingham
(74) *Attorney, Agent, or Firm*—Cobrin & Gittes

(57) ABSTRACT

A device for locking in a removable way a mechanical member with a taper bore onto a shaft having a cylindrical section. A first bush is provided that has internal and external surfaces. A second bush is provided that is suitable to be inserted into the first one. The second bush has an external conical surface and a cylindrical internal surface. The relative axial position of the bushes are varied to engage and disengage the mutual coupling between the bushes and the coupling of the device with a shaft or with the mechanical member.

18 Claims, 3 Drawing Sheets

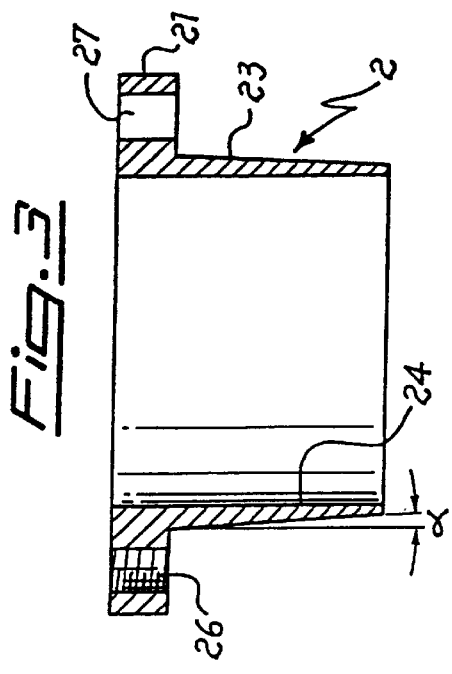
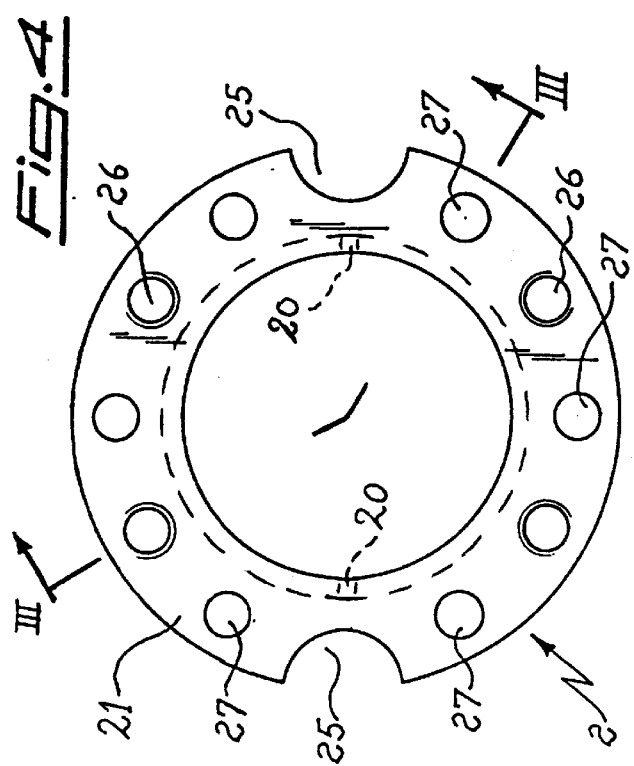
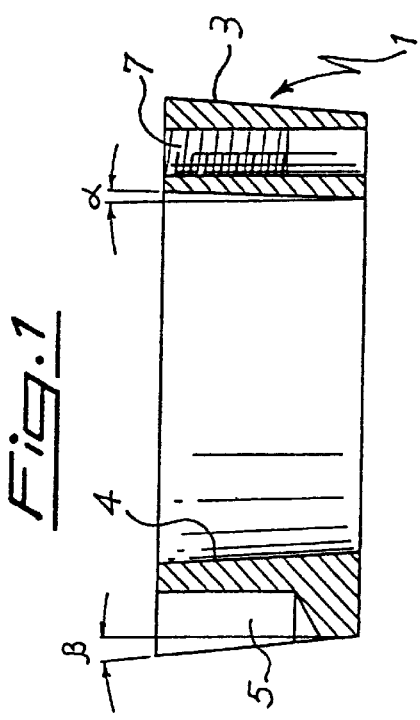
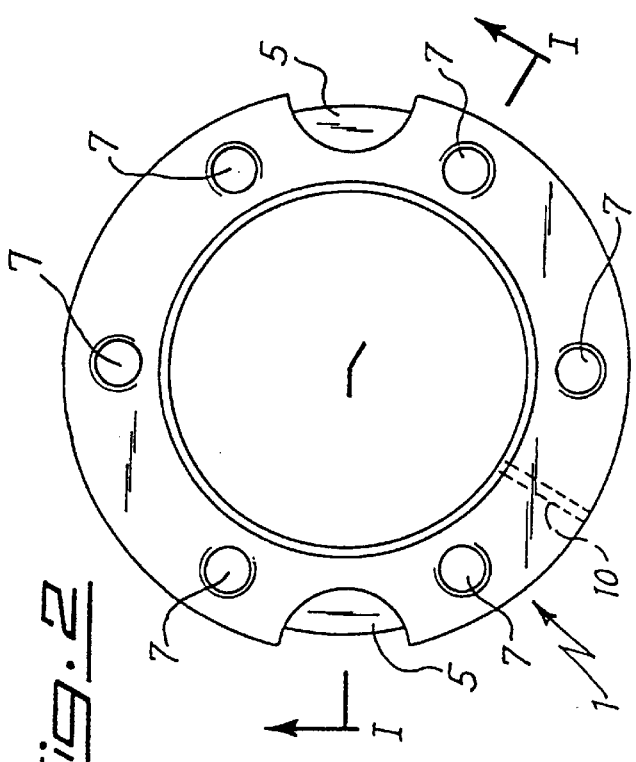

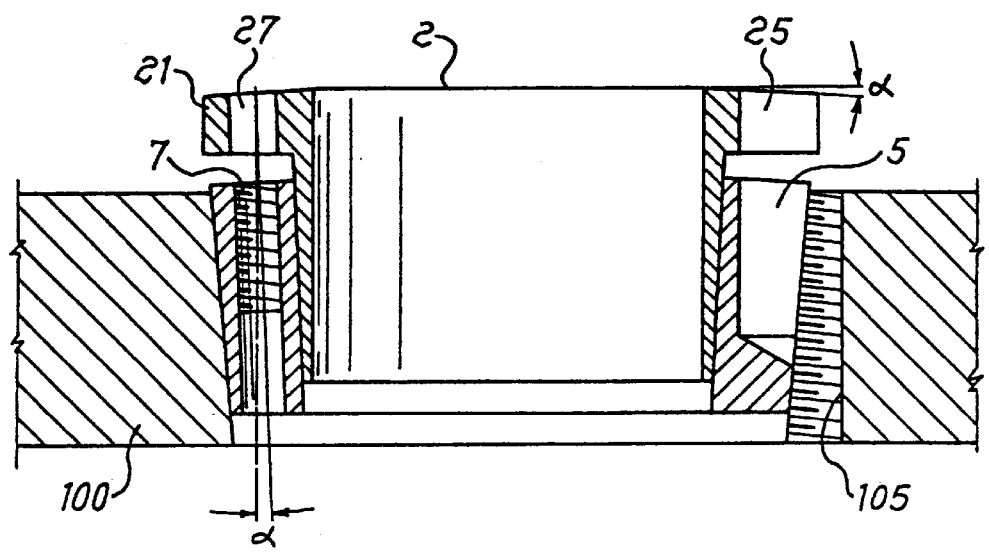
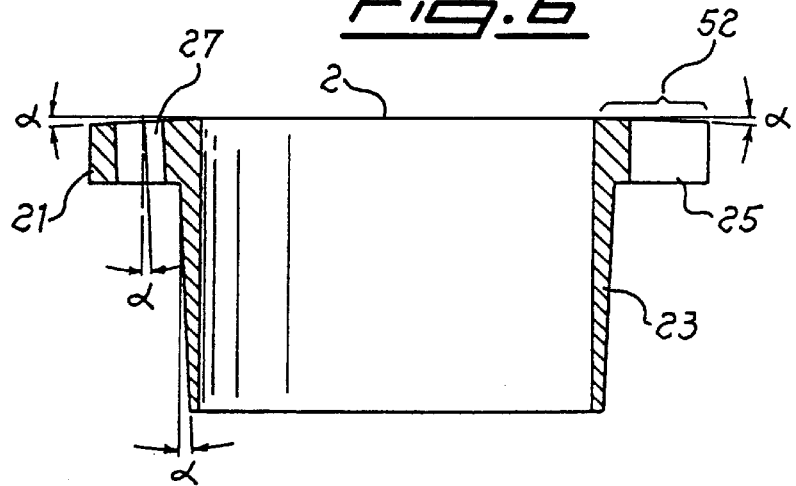
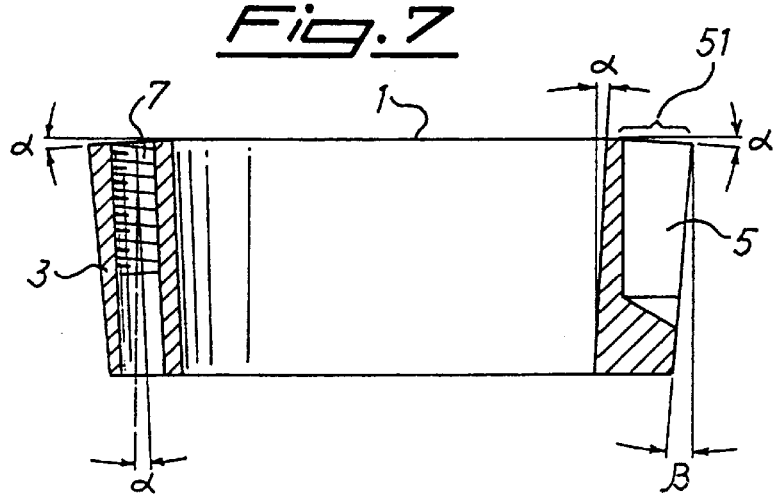

DEVICE FOR LOCKING A MECHANICAL MEMBER ONTO A SHAFT

FIELD OF THE INVENTION

The present invention relates to a device for locking a mechanical member onto a shaft in a removable way and, in particular, a device which allows a mechanical member provided with a conical bore to be locked onto a cylindrical shaft.

BACKGROUND OF THE INVENTION

Devices have long been known which allow the removable locking of mechanical members onto shafts and which provide a split bush having a conical external surface and a cylindrical internal surface. At least a pair of hollows suitably located on the external surface of the bush, in positions corresponding to tapped hollows on the bore of the mechanical member, allows the same bush to be fixed to the hub of the mechanical member by means of bolts or grub-screws. On the external surface of the bush it is further provided a tapped hollow, in a position corresponding to a smooth hollow on the bore of the mechanical member, in order to allow the removal of the bush from the mechanical member by means of one of the two previously removed grub-screws.

A keyway is provided on the internal surface of the bush and on the external surface of the shaft to allow the same bush to be fixed to the shaft. An example of such a known device is commercially available under the trade name SER-SIT®.

The key is not very suitable in the cases in which the mechanical member must be locked in position distant from the ends of the shaft because of the difficulties of working keyways in such positions. Furthermore, the fixed position of the keyway constitutes a limitation of the angular positioning of the mechanical member on the shaft.

The presence of a keyway on the shaft, beyond requiring suitable working, weakens the structure of the some shaft. Therefore, for parity of transmitted torque, it is necessary to provide shafts with wider total section to give the necessary effective section.

Then it is also known that coupling by means of keys causes the formation of fretting corrosion due to the clearance (which increases with the time) between the shaft and the bush fixed on with the key. The clearances generated between bush and shaft causes a loss of precision in the angular positioning of the mechanical member with respect to the shaft and can also cause the break-up of the same key.

Furthermore, the need of providing a tapped hollow on the external surface of the bush requires a long and fine working and a considerable waste of material. Indeed, in order to obtain such a bush, it is necessary to drill and thread a piece having a greater diameter with respect to that of the final bush and then to turn the external surface of the piece until the tapped hollow on the conical external surface is obtained. It is evident that this involves considerable costs of production.

Friction-based locking bushes are also known, which are used for locking mechanical members having a cylindrical bore, comprising at least a pair of taper split bushes.

For allowing the transmission of the torque by friction, the locking bushes of this type develop notable radial pressures which bears on the hub of the mechanical member. Therefore, these locking bushes require mechanical members with very wide hubs compared to the section of the shaft (diameter up to four times the diameter of the shaft for hubs made from cast iron type G-20) and dependent in any case on the yield point of the material of the hub.

Locking bushes of this type can also have dismantling problems owing to the locking of the two split bushes onto the respective coupling surfaces. Until today, although these disadvantages have been known for some time, no suitable product to overcome the cited drawbacks has been proposed to the knowledge of the Applicant.

The above disclosed disadvantages of the known devices cause notable problems, both technical and of cost, and therefore there is a long time need for a technical solution which allows such drawbacks to be overcome.

DISCLOSURE OF THE INVENTION

The object of the present invention is to produce a device for the removable locking of mechanical members onto a shaft which permits a high facility in assembly and dismantling.

Another object of the present invention is to produce a device for the removable locking of mechanical members which could be suited to use with shafts of reduced diameter, as well as with hubs of reduced diameter, and in any case with shafts and hubs having very similar diameters.

Still another object of the present invention is to produce a device which allows a mechanical member to be locked onto a shaft in a removable way with high degree of precision both angular and axial. A further object of the present invention is to produce a device for the removable locking of mechanical members onto a shaft which avoids the formation of fretting corrosion between the mutually joined elements, i.e. between shaft, device and hub.

There arises between the bushes, the shaft and the mechanical member a friction coupling able to transmit particularly high-value torques without the use of a key. Therefore, clearance between the device and the shaft is avoided preventing the formation of fretting corrosion of the surface in contact with the shaft. Moreover, the total absence of clearance assures a more precise and reliable locking over time since it is no longer subjected to a key wearing out or possibly breaking up.

Greater freedom, as well as better precision, of axial and angular positioning of the mechanical member on the shaft is obtained.

For parity of transmitted torque, the device according to the invention uses smaller-section shafts, there not being the necessity of a keyway on the same shaft any longer.

Furthermore, the operations of assembly and/or dismantling of the mechanical member from the shaft are notably simplified, irrespective of the position in which the mechanical member is locked onto the shaft. In fact, the device according to the invention allows different possibilities for the removal of the mechanical member from the shaft. For instance, by acting on the means for fixing the first bush to the mechanical member, it is possible to remove only the mechanical member leaving the locking device fixed to the shaft. Alternatively, acting on the means for varying the relative axial position of the bushes, it is possible to disengage the mutual coupling of the conical bushes while maintaining the joint between the first bush and the mechanical member.

A further advantage is due to the notable economic saving from the reduction in the number and type of mechanical members which must be held in stock by users. The device according to the invention is in fact suitable also for the locking of mechanical members having hubs of reduced dimensions, and also for shafts having reduced diameter, compared to that required for the known type of lockings.

Moreover, the device according to the invention could be used advantageously—without requiring any modification—with mechanical members having a taper bore and which were pre-set for the known type of locking bushes.

According to a preferred embodiment of the invention, only smooth hollows are provided on the external surface of the first bush, thus avoiding the need of a considerable working of the external surface of the bush.

According to a possible embodiment, the first bush consists of a solid bush and the second bush has at least a split portion. Alternatively, also the first bush is of the split type.

The second bush has an annular flange at one of its end and comprises at least one longitudinal cut on at least the portion having the conical external surface.

According to the preferred embodiment, there are provided two diametrically opposite cuts only in the portion having the conical external surface, i.e. without any cut being provided on the annular flange. This ensures a better distribution of the mechanical stress with respect to a completely splitted bush, as well as a better concentricity of the device when it is mounted. Furthermore, a non-cut annular flange is less weakened and does not buckle under the pressure of the screws during the mounting.

In each case, the notable radial pressures due to the coupling between the two bushes bear on the first bush instead of on the hub of the mechanical member, thus allowing the use of mechanical members with a hub of diameter very near to the diameter of the shaft.

The conical internal surface of the first bush and the conical external surface of the second bush have a pitch angle chosen between 1° and 10° in function of the opposite needs to be satisfied, i.e. that of allowing a high transmission of torque (for instance 1°) and that of preventing seizure between the two bushes and facilitating the removal of the device (for instance 10°). According to a preferred embodiment of the invention, an angle of 3° is selected, which represents a good compromise between the two opposing needs cited above.

The means for varying the relative axial position of the bushes, and in particular for tightening the joint between the two bushes and the joint of the second bush with the shaft, comprise a plurality of bolts inserted in equally angularly spaced through-holes in an annular flange of the second bush and engaging in corresponding tapped holes situated in the body of the first bush. Therefore, a uniform coupling between the bushes can be simply assured by tightening the equally angularly spaced bolts along the whole flange.

According to an advantageous embodiment of the invention, the through-holes on the annular flange and the tapped holes arranged in the body of the first bush hove axes tilted with respect to the axis of the bushes. Moreover, also the flange of the second bush has preferably a portion of its external surface tilted with respect to a plane perpendicular to the axis of the bush.

These angles of inclination are preferably equal to the pitch angle of the external surface of the second bush, thus limiting the overall dimensions of the device and, in particular, of the first bush.

BRIEF DESCRIPTION OF THE DRAWINGS

Further advantages and characteristics of the invention will be more evident from the description which follows, made for is illustrative but not limiting purpose, with reference to the schematic drawings, in which:

FIG. 1 is a cross-section view, along the line 1—1 of FIG. 2, of one of the bushes of the device according to an embodiment of the present invention;

FIG. 2 is a top plan view of the bush shown in FIG. 1;

FIG. 3 is a cross-section view, along the line 111—111 of FIG. 4, of another of the bushes of the device according to an embodiment of the present invention;

FIG. 4 is a top plan view of the bush shown in FIG. 3;

FIG. 5 is a cross-section view of a mechanical member coupled with a device according to another-embodiment of the invention;

FIG. 6 is a cross-section view of one of the bushes of the device shown in FIG. 5;

FIG. 7 is a cross-section view of another of the bushes of the device shown in FIG. 5;

MODES OF CARRYING OUT THE INVENTION

Figure 8:
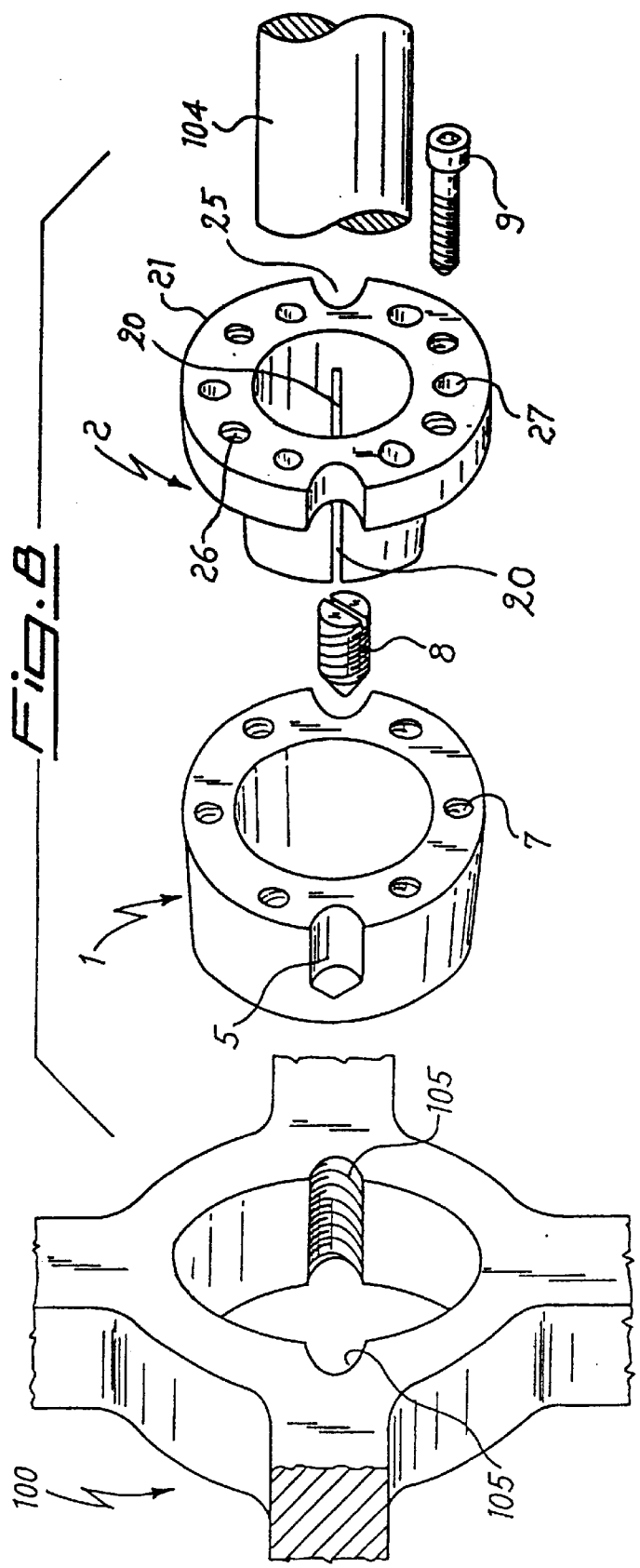
FIG. 8 is a perspective view, with elements not assembled, of a device according to the invention, of a mechanical member to be locked, and of an axis on which the mechanical member must be locked.

The locking device according to the invention comprises a first bush 1 (FIGS. 1 and 2) having a conical external surface 3 and an internal surface 4 also conical. The bush 1 is equipped with a recess 5 which allows the fixing of the bush 1 to the hub of a mechanical member by means of bolts or grubscrews. In particular, the recess 5 is smooth and lines up with the corresponding tapped recess 105 on the mechanical member 100 to allow the fixing of the bush by means of bolts or grub-screws 8 (see for instance FIG. 8).

The tapped holes 7 receive the locking bolts 9 (FIG. 8) of a second bush 2 (FIGS. 3 and 4) having such shape and dimensions as to allow it to be inserted in the first bush 1.

The bush 1 shown in FIGS. 1 and 2 is preferably a "solid" bush but it is however also possible to use a "split" bush. The term "split" is understood to mean a bush provided with a longitudinal split 10 (shown by the broken line in FIG. 2) which extends for the whole length of the bush. FIGS. 3 and 4 show a second bush 2 provided with a conical external surface 23 and a cylindrical internal surface 24. According to the preferred embodiment, the bush 2 is split at 20 (FIG. 4) in diametrically opposite positions and is provided with a non-cut flange ring 21 at one end.

On the flange ring 21 are drawn a pair of hollows 25 which allow the access of a utensil to screw or unscrew the fixing bolts or the grub-screws 8 of the bush 1. On the flange 21 are also drilled the through-holes 27 for the bolts 9 which engage in the tapped holes 7 of the bush 1. The through-holes 27 and the topped holes 7 are angularly equally spaced, for example at 60° to each other if six holes 7 and 27 are provided on the first bush 1 and the flange 21 of the second bush 2.

There are moreover tapped through-holes 26 provided on the flange 21 to receive bolts or threaded pins which engage on the body of the bush 1 and allow uncoupling of the joint between the bushes 1 and 2, naturally after the removal of the fixing bolts 9.

The conical external surface 3 of the bush 1 is generally tilted at an angle β identical to the angle of the taper bore of the mechanical member to be locked. The angle β is selected in the interval between 1° and 10° and is preferably fixed at 4°.

The conical internal surface 4 of the first bush 1 and the conical external surface 23 of the second bush 2 are in their turn tilted at an angle α which could vary between 1° and 10° and is preferably fixed at 3°.

FIG. 5 shows a mechanical member 100 with a locking device according to another embodiment of the present invention. The bushes 1 and 2 of the locking device of FIG. 5 are shown in FIGS. 6 and 7.

According to this embodiment, the through-holes 27 on the flange 21 of the bush 2 and the tapped holes 7 in the bush 1 have axes tilted with respect to the axis of the bushes. The angle of inclination is preferably equal to the angle α, i.e. equal to the pitch angle of the external surface 23 of the second bush 2 and to the pitch angle of the internal surface 4 of the first bush 1.

Moreover, the flange 21 of the second bush 2 has a peripheral portion 52 of the external surface which is tilted at an angle a with respect to a plane perpendicular to the axis of the same bush 2. If necessary, also the first bush 1 has a peripheral portion 51 of the front surface which is tilted at an angle α with respects to a perpendicular plane to the axis of the same bush 1. This allows the advantageous reduction of the overall size of the device.

FIG. 8 shows the locking device according to the invention together with a shaft 104 and to a mechanical member 100 which must be locked onto the same shaft. The locking is carried out by fixing the bush 1 by means of the grub-screws 8 (of which only one is shown for simplicity) which engage through the tapped recesses 105 on the hub of the mechanical member 100 and the smooth recesses 5 on the same bush.

The shaft 104 is inserted into the bush 2, which is in its turn inserted inside of the bush 1. The tightening of the joint between the bushes 1 and 2, as well as that between the bush 2 and the shaft 104, is carried out by means of a plurality of bolts 9 (of which only one is shown for simplicity) inserted in the through-holes 27 on the flange 21 of the bush 2 and screwed into the tapped holes 7 on the bush 1. As already disclosed above, the uncoupling between the bushes 1 and 2 is carried out by means of bolts which are screwed into the tapped holes 26 on the flange 21 of the bush 2 and which bear on the body of the bush 1.

After this operation, it is also possible to remove the bush 1 from the mechanical member 100 in the following way. Firstly, the grub-screws 8 should be partially unscrewed until they are in projecting with respect to the first bush 1 and the hub of the mechanical member 100. After that, the second bush 2 should be inserted in the first bush 1 and rotated with respect to the same until the through-holes 27 on the annular flange 21 are aligned with the tapped holes 7 of the first bush 1 and the hollows 25 on the flange 21 are misaligned with respect to the grub-screws 8. At this point, by screwing two or more of the fixing bolts 9 on the aligned holes 27 and 7, the flange 21 is brought in abutment against the projecting grub screws 8, thus allowing to pull out the first bush 1 from the hub of the mechanical member.

Figure 9:
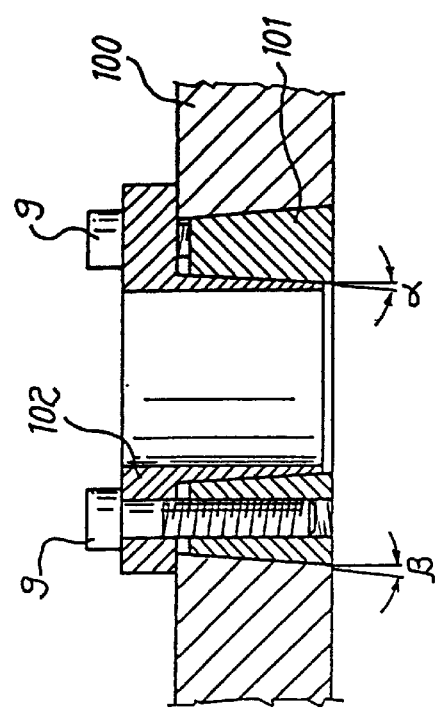
FIG. 9 is a cross-section view of a further embodiment of the device according to the invention.

FIG. 9 shows a further embodiment of the locking device according to the invention. While in the embodiments previously illustrated, the internal and external surfaces of the first bush 1 are tilted in the same sense, in the embodiment shown in FIG. 9 the first bush 101 has the external surface tilted in the opposite sense with respect to the internal surface, while the second bush 102 is substantially similar to the bush 2 of the embodiments already described with reference to FIGS. from 1 to 8.

In the embodiment illustrated in FIG. 9 the coupling of the bushes 101 and 102 with the shaft 104 and the hub of the mechanical member 100 is achieved by means of bolts 9 alone, making superfluous the use of grub-screws for fixing the bush 101 to the same mechanical member, but allowing the bush 101 to be used with the mechanical members provided with the recess 105.

What is claimed is:

1. A device for locking in a removable way a mechanical member having aa taper bore onto a shaft having a cylindrical section, of the type comprising:

at least one first bush having a conical external surface and one or more grub-screws or bolts, each engageable for fixing said first bush to the mechanical member, said first bush having a conical internal surface;

at least one second bush having a cylindrical internal surface and a conical external surface to bear against the conical internal surface of said first bush, said second bush being of such shape and size as to be inserted at least partially into said first bush;

means for varying the relative axial position of the bushes; and said first bush consists of solid bush and said second bush consists of a bush having at least a split portion.

2. A device according to claim 1, characterised in that said first bush has only smooth recesses on its conical external surface.

3. A device according to claim 1, characterised in that the split portion of said second bush comprises two or more longitudinal cuts in equally angularly spaced positions.

4. A device according to claim 1, characterised in that the split portion of said second bush comprises two cuts in diametrically opposite positions.

5. A device according to claim 1, characterised by the conical external surface of said first bush having a pitch angle between 1° and 10°.

6. A device according to claim 5, characterised by the conical external surface of said first bush having a pitch angle about 4°.

7. A device according to claim 1, characterised by the conical internal surface of said first bush and the conical external surface of said second bush having a pitch angle between 1° and 10°.

8. A device according to claim 7, characterised by the conical internal surface of said first bush and the conical external surface of said second bush having a pitch angle about 3°.

9. A device according to claim 1, characterised by the conical internal surface and the conical external surface of said first bush being tilted in the same direction.

10. A device according to claim 1, characterised by the conical internal surface and the conical external surface of said first bush being tilted in opposite directions.

11. A device according to claim 1, characterised by said second bush being provided with an annular flange at one of its ends.

12. A device according to any of the preceding claim, characterised by said means for varying the relative axial position of said bushes comprising a plurality of bolts inserted in through-holes located on the annular flange of the said second bush and engaged in corresponding tapped holes arranged in the body of said first bush.

13. A device according to claim 12, characterised in that said through holes and said tapped holes are equally angularly spaced.

14. A device according to claim 1, characterised by said means for varying the relative axial position of said bushes comprising a plurality of bolts which bear against the body of said first bush and engage in corresponding tapped holes located on the annular flange of said second bush.

15. A device according to claims 1, characterised by said tapped holes, said through-holes located on said annular flange and said tapped holes arranged in the body of said first bush having axis tilted with respect to the axis of said bushes with an angle equal to the pitch angle of the external surface of said second bush.

16. A device according to claim 1, characterised by said flange having a portion of the external surface tilted with respect to a plane perpendicular to the axis of said second bush with an angle equal to a pitch angle of a surface selected from a group consisting of an internal surface of said first bush and an external surface of said second bush.

17. A device according to claim 1, wherein said means for varying is configured and arranged to vary the relative axial position of the bushes so as to effect engagement and disengagement of at least one coupling selected from a group consisting of a mutual coupling of said bushes, a coupling of the device with the shaft, and coupling of the device with the mechanical member, and any combination thereof.

18. A device according to claim 1, in combination with the mechanical member, the mechanical member having a bore with a tapped hollow, the first bush having an external surface with a smooth hollow, each of the one more grub-screws or bolts being engageable between the tapped hollow and the smooth hollow.

* * * * *